US006291829B1

(12) United States Patent
Allen et al.

(10) Patent No.: US 6,291,829 B1
(45) Date of Patent: Sep. 18, 2001

(54) IDENTIFICATION OF RECORDING MEDIUM IN A PRINTER

(75) Inventors: Ross R. Allen, Belmont; Barclay J. Tullis, Palo Alto, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/264,158

(22) Filed: Mar. 5, 1999

(51) Int. Cl.[7] .......................... G01N 21/47; G01N 21/86

(52) U.S. Cl. ............................... 250/559.07; 250/559.16; 250/559.4; 356/446

(58) Field of Search ............................. 250/208.1, 208.2, 250/223 R, 559.1, 559.07, 559.11, 559.15, 559.16, 559.4; 356/445, 446, 448, 429; 358/475, 487, 498; 347/16, 19

(56) References Cited

U.S. PATENT DOCUMENTS 5,139,339 8/1992 Courtney et al. .................... 356/446
5,323,176 6/1994 Sugiura et al. ........................ 346/25
5,686,720 * 11/1997 Tullis ............................... 250/208.1
5,764,251 * 6/1998 Hashimoto ............................ 347/16
5,925,889 * 7/1999 Guillory et al. ................ 250/559.16
5,969,371 * 10/1999 Anderson et al. .............. 250/559.15

FOREIGN PATENT DOCUMENTS

10039556 * 2/1998 (JP) .
10198174 * 7/1998 (JP) .

* cited by examiner

*Primary Examiner*—John R. Lee

(57) ABSTRACT

The present invention is a method and device for identifying recording media in a printer. The invention utilizes fine structure of the media revealed by illumination from one or more directions to distinguish among different kinds of plain papers, coated papers, such as glossy papers, and transparency films. When the medium is bond paper, by introducing light at an angle of less than approximately sixteen degrees relative to the surface, raised surface irregularities cast shadows creating a pattern rich in detail. For glossy surfaces, a high contrast image is obtained in the specular direction from normally incident illumination. The medium surface is imaged on an optoelectronic sensor to form a characteristic vector which is compared with reference vectors, corresponding to different media types, to determine the recording medium. The detection of the recording medium may then be used to change the characteristics of the printer.

29 Claims, 4 Drawing Sheets

IDENTIFICATION OF RECORDING MEDIUM IN A PRINTER

TECHNICAL FIELD

The present invention relates generally to devices and methods for identifying media and more specifically to devices and methods for identifying recording media in a printer or reproduction device.

BACKGROUND ART

Modern printing devices, for example, ink jet and laser printers, print on a wide range of print media. Such media include plain paper, glossy or coated papers, and plastic films including overhead transparency film. For optimal print quality, operating parameters of these printers may be adjusted to meet the requirements of each print medium. Parameters in the image rendering process, in a host computer or in an "on-board" computing engine in the printer, also depend upon media type. For example, the "gamma" (i.e., tone reproduction curve) used for reflective prints (on paper and other reflective media) is different than that used for transparency media. This is required to adapt the printed image to the characteristics of the human visual response under different lighting and viewing conditions. Therefore, both the recording process in the printer and the image rendering process, in a host computer or on-board computing engine, may require knowledge of media type for optimal print quality.

The software controlling the rendering process and the printer, including the printer driver, sometimes gives the user the opportunity to specify the recording medium. Parameters of the rendering and recording processes are then adjusted according to the recording medium and the quality mode selection. However, users may not always make the correct choice. In addition, specifying the choice is often inconvenient when multiple copies on different media are desired as occurs when overhead transparencies and hardcopy for handouts must be produced from the same data file.

One approach to this problem is to use recording media marked by machine-readable, visible, near-visible, or invisible marks forming bar codes or other indicia that specify media type and automatically provide process information to the printer. While this offers a practical solution, not all media available to the user will contain these codes.

Other approaches known in the art distinguish between two broad classes of media, transparency film and paper. For example, U.S. Pat. No. 5,139,339, to Courtney et al. discloses a sensor which measures diffuse and specular reflectivity of print media to discriminate between paper and transparency film and to determine the presence of the print medium. Other art cited in Courtney et al. deals mainly with analyzing specular reflections over an area. U.S. Pat. No. 5,323,176 to Suguira et al. describes a printer with means to discriminate between "ordinary printing paper" and "overhead projection transparency film" on the basis of its transparency or opacity. However, these references, which rely on gross properties of the print medium either in reflection or transmission, do not allow any finer distinctions. What is needed is a method to distinguish print media that goes beyond the simple categorizations of the prior art.

SUMMARY

The present invention relates to a method and device for identifying recording media in a printer. The invention utilizes surface properties and fine structure of the media revealed by illumination from one or more directions to distinguish among different kinds of plain papers, coated papers, photographic papers, and transparency films.

When the medium is bond paper, a surface-texture image is obtained by directing illumination at a grazing angle relative to the surface. Grazing angles is below about thirty degrees, and preferably less than about sixteen degrees are used. By directing light at such angles, surface depressions and raised surface irregularities cause shadows, creating an imagable surface texture or pattern rich in detail. For typical bond papers, fibers in the paper surface create structural features with characteristic dimensions in the range of 1 to 100 $\mu$m. Viewed with resolution-limiting optics, only the larger shadow features are seen and produce an image unique to bond paper. Thus, a preferred combination for bond paper is grazing illumination and low resolution optics which highlight the lower spatial frequency features.

For highly glossy surfaces, such as photographic paper, specularly reflected light from normal illumination provides an especially rich image of closely spaced features with characteristic feature dimensions on the order of 5 $\mu$m. Thus a preferred combination for photographic paper is normal incidence illumination with high magnification.

Coated media and the surfaces of transparencies are relatively smooth and flat but have some relatively sparse distributions of small and shallow holes that can be imaged with some contrast using grazing illumination and a modest magnification.

According to an aspect of the present invention, a suitable compromise enables a device for identifying recording media to use a single choice of optics in combination with both normal and grazing incidence illumination to image distinguishing features of bond paper, coated paper, photographic paper, and transparencies.

The device of one embodiment of the present invention includes one or more sources of illumination, positioned to irradiate the recording medium surface at a grazing incidence, or at normal incidence, or positioned to direct light through the recording medium. These sources produce an optical signal representative of the recording medium. The optical signal is effectively captured by imaging optics and detected by an optoelectronic sensor with a projected pixel dimension on the surface of the recording media less than 100 $\mu$m. The optoelectronic sensor typically is a two-dimensional photodetector array. Alternatively, a linear array could be used or the recording medium could be scanned past a linear photodetector array to produce a two-dimensional image.

The photodetector array is typically connected to at least one analog to digital converter ("ADC") through analog buffering and switching circuits. These circuits present the analog voltages (or charges) from each photodetector in the array serially to the ADC, or present values row-wise or column-wise in an arrangement where there are parallel ADCs. Digitized values, representing the light received from the media by each element of the photodetector array, are communicated to a processor to perform the required calculations to identify the media. A set of characteristic values is extracted representative of the media and is communicated, for example, to the host computer to provide information to the printer driver.

Optimal settings for parameters in the rendering and recording process are associated with each type of recording medium. Frequently, the printer driver on the host computer controls the parameters of the rendering and recording processes. For rendering, these include selection of tone reproduction curves, halftone and error-diffusion algorithms, color maps and gamut adjustment and others. For the recording process in an ink jet printer, these include ink drop volume, number of ink drops per pixel, number of passes of the printhead over a pixel, the order and pattern in which drops are printed in a pixel or a region of pixels, and information presented on the printer's display panel.

The determination of media type is often preferably made in the host computer for two reasons. First, the media type determines parameters for both image rendering and printer marking processes. Images are rendered with consideration to parameters of the marking process, and rendering and marking must be coordinated. Second, because new media may be introduced and process changes may require tuning the identification process, the manufacturer can update the capability of the host/printer system to differentiate media by providing the user with an updated printer driver containing the identification criteria and categories. It is possible, however, with future proliferation of information appliances, that the determination of media type may be done within the printer itself.

In one embodiment, an unprinted region of the recording medium is imaged and the sensor output is converted to digital form and processed to form a characteristic vector, or array of values. This vector is compared to previously stored reference vectors, each reference vector being characteristic of a different type of recording medium, to determine the recording medium type. Along with possibly a quality level (e.g., "draft," "normal," and "best") selected by the user, the type of recording medium thus determined is used in the raster image processing pipeline to render optimally the printed information and by the printer controller to control the recording process.

DETAILED DESCRIPTION OF THE EMBODIMENTS

Figure 1:
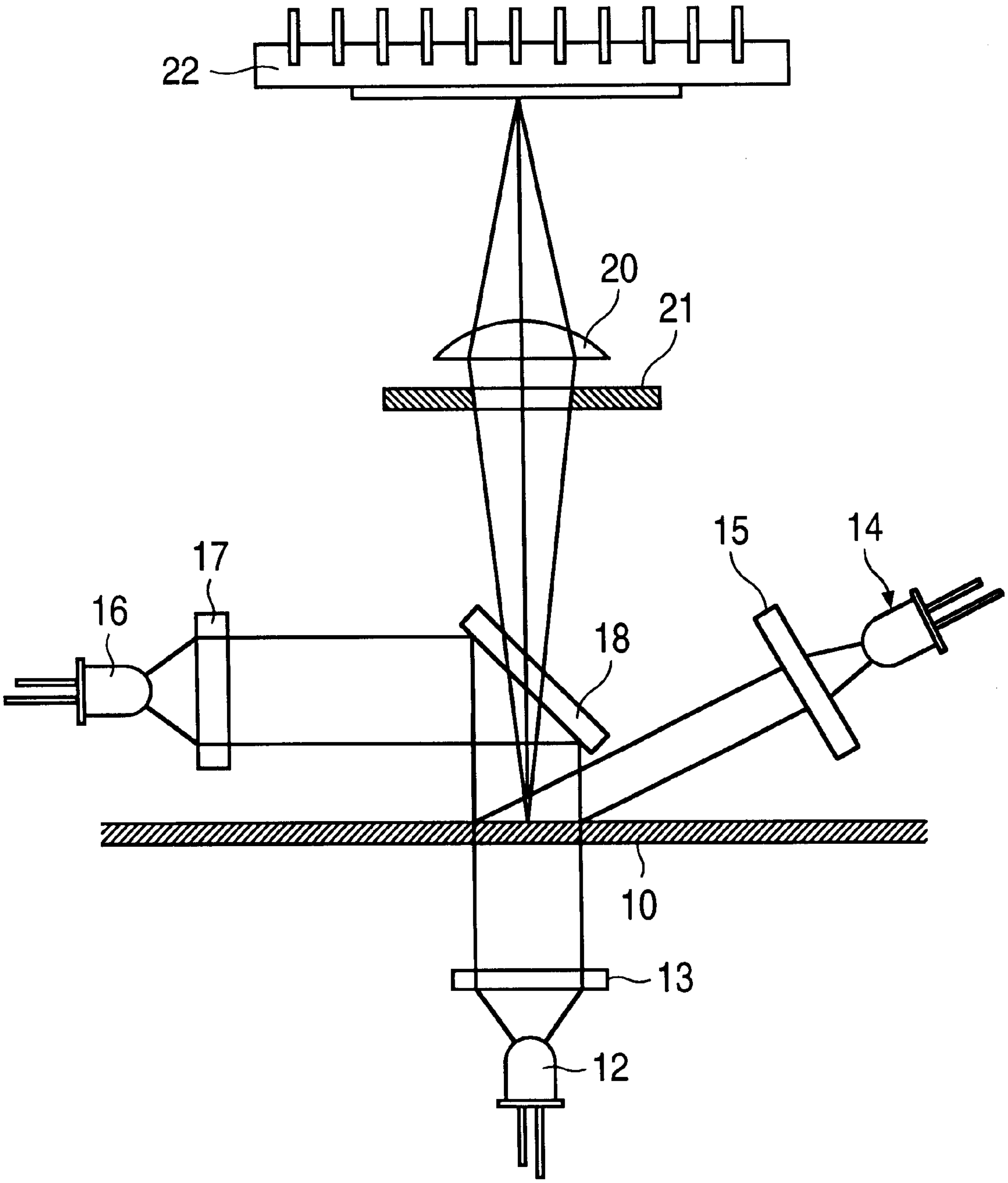
FIG. 1 is a schematic view of the illumination sources and photodetector array, according to one embodiment of the present invention.

A method and device for identifying recording media in a printer is described below. The method is based on imaging the fine structure of the recording media. Plain and special papers as well as photographic papers and other recording media have a detailed structure that when viewed under magnification and suitably illuminated is useful for discrimination between media types.

Visible features used for media identification result from choices of illumination source and imaging optics, and the optimal choice can be different for each medium. Bond paper has a rich surface structure with characteristic feature sizes in the range between about 1 and 100 μm. When these features are highlighted with grazing light (light that has large angles of incidence relative to the surface normal), this light interacts with the bulk of paper fibers at or near the surface to create contrast-enhancing shadows much larger than the diameters of individual fibers. Viewed with resolution-limiting optics, only the larger shadow features are seen and produce an image unique to bond paper. Thus, a preferred choice for bond paper is grazing illumination and low resolution optics which highlight the lower spatial frequency features. Low resolution optics permits a relatively deep depth of field.

When bond paper is illuminated at higher angles off the paper surface and imaged with higher magnification, the higher spatial frequency features caused by individual fibers will have lower contrast. Also, higher magnification is associated with a shallower depth-of-field and therefore imaging with high magnification requires tighter alignment tolerances on the distance from the optics to the surface of the medium, in practice.

Photographic paper typically has closely spaced microscopic pits or depressions on the surface. When normally incident illumination is used on photographic paper, light that is specularly reflected off the peaks and interiors of such pits, in directions normal or slightly perturbed from the normal, produces a feature-rich and high contrast image with characteristic feature dimensions on the order of 5 μm. Thus a preferred choice for photographic paper is normally incident illumination with higher magnification.

Coated media and the surfaces of transparencies are relatively smooth and flat but have some small and shallow holes, although with relatively sparse distributions, that can be imaged with some contrast using grazing illumination and a low or high magnification.

According to an aspect of the present invention, a suitable compromise enables a device for identifying recording media to use a single choice of optics in combination with both normal and grazing incidence illumination to image distinguishing features of bond paper, coated paper, photographic paper, and transparencies.

As described further below, in addition to discriminating on the basis of feature dimensions, different media may be distinguished by such properties as density of features, spatial frequency of features, total reflectivity, contrast range, and gray-scale histograms.

The recording media identification device of one embodiment of the present invention includes one or more illumination sources as shown schematically in FIG. 1. Three sources of illumination 12, 14, and 16, are directed at recording medium 10, supported on a media path (not shown). The transmission illuminator 12 is positioned below the recording medium 10 such that light from source 12 is collimated by illumination optics 13 and passes through the medium 10. Grazing illuminator 14 provides light on the medium 10 at a grazing angle of incidence. Light from grazing illuminator 14 is collimated by illumination optics 15 and/or by optics included in illuminator 14. The grazing angle, which is the complement of the angle of incidence, is less than about thirty degrees. To obtain higher contrast, preferably, the grazing angle is less than about sixteen degrees.

The illumination source 16 for normal incidence illumination (i.e., perpendicular to the plane of medium 10) is also represented in FIG. 1. Light from normal illuminator 16, collimated or imaged by illumination optics 17, is redirected by an amplitude beam splitter 18 to illuminate the medium 10 at normal incidence. The portion of the light from normal illuminator 16 transmitted straight through the amplitude beam splitter 18 is not shown in FIG. 1, and is typically not used.

The recording medium identification device further includes a photodetector array 22 shown at the top of FIG.

1. Light from the grazing angle illuminator 14, for example, which is scattered by the medium, passes through the amplitude beam splitter 18, an aperture 21, and imaging optics 20, and is detected by the photodetector array 22. The photodetector array 22 similarly senses reflected light from normal illuminator 16 and transmitted light from illuminator 12. In an alternative geometry, normal illuminator 16, illumination optics 17, and amplitude beam splitter 18 could be positioned much further above the plane of medium 10 such that beam splitter 18 is between photodetector array 22 and imaging optics 20, with an appropriate modification in optic power of normal illuminator 16 and illumination optics 17.

The photodetector array 22 is an array of optoelectronic image sensing devices, such as CCD or CMOS devices. In a preferred embodiment, the photodetectors are arranged in a two-dimensional array. To insure that the image field contains a sufficient number of features for medium identification, practical arrays may require as many as 100 by 100 elements, but smaller arrays of as few as 16 by 16 are preferable from design, cost, and signal processing considerations. It is not necessary for the number of elements in the two orthogonal directions to be equal.

The image resolution for scanning the medium 10 surface can be determined by the most demanding medium to be identified, that is the medium and illumination combination resulting in an image with the smallest maximum feature size. For example, to distinguish bond paper and coated paper, the appropriate resolution corresponds to a pixel dimension on the surface of medium 10 (i.e., the projected pixel dimension) on the order of 40 $\mu$m on a side. In another embodiment, a projected pixel dimension of approximately 5 $\mu$m on a side will allow photographic paper to be better identified.

One suitable compromise for discriminating bond paper, coated paper, and photographic paper with a single set of optics is to use optics with a resolution of about 10 $\mu$m, which can be used with both grazing and normal incidence illumination. For imaging optics 20 that provide a 5-fold magnification, in this embodiment, each array element of photodetector array 22 is approximately 50 $\mu$m on a side. For a photodetector array 22 of 100 by 100 elements, using 50 $\mu$m elements and optics with a 5×magnification, an area of the surface of medium 10 that is 1 mm on a side should be illuminated. Those skilled in the art will appreciate the tradeoff between feature identification and the size of the photodetector array and recognize the possibility of reducing cost by using photodetector arrays with fewer elements. Those skilled in the art will also realize additional engineering tradeoffs are possible among resolution, magnification, and size of the elements of the photodetector array.

The illumination sources 12, 14, and 16 may be one or more light emitting diodes. Alternatively, the illumination sources may be other light sources such as incandescent lamps, laser diodes or surface emitting laser diodes. For applications where medium 10 is moving rapidly, the light sources may be pulsed at higher drive levels to assure sufficient photons reach the photodetector during the exposure interval and to prevent motion blurring. The illumination optics 13, 15, and 17, which may be conventional, may comprise a single element or a combination of lenses, filters, and/or diffractive or holographic elements to accomplish suitably collimated and/or generally uniform illumination of the target surface.

In an alternative embodiment, the photodetector array 22 is a linear array and the recording medium is scanned past the photodetector array to produce a two-dimensional image. For example, medium 10 is scanned past photodetector array 22 by the medium transport mechanism of a printer to which the recording medium identification device of the present invention is attached. In another embodiment, photodetector array 22 is a one-dimensional array and forms a one-dimensional image, without the medium moving, that is used for medium identification. Alternatively, a single photodetector element is used and the medium feeding mechanism of the printer is used to scan the medium such that a one-dimensional image is created and used for medium identification.

Figure 2:
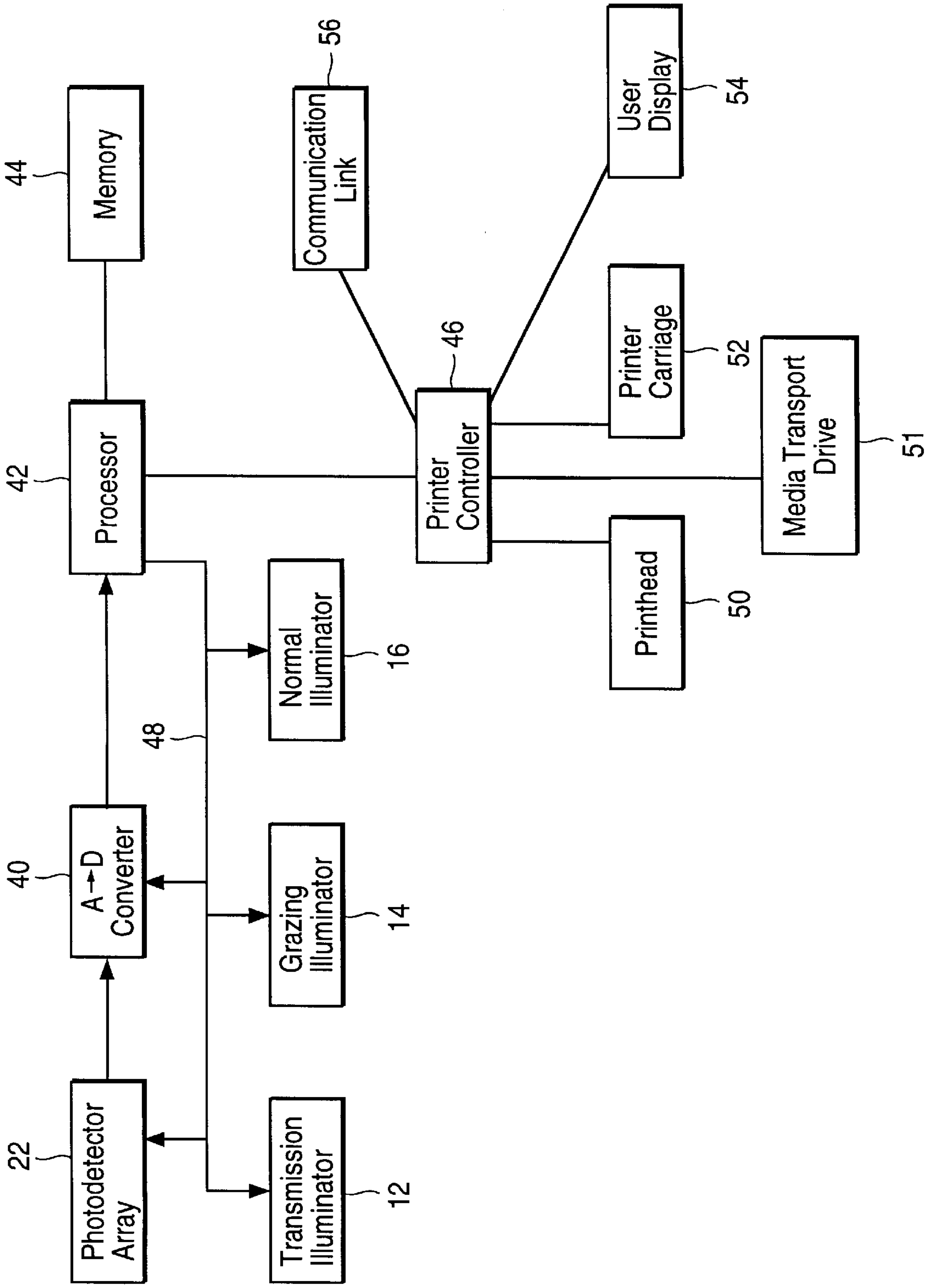
FIG. 2 is a block diagram of the components of the recording media identification device, according to an embodiment of the present invention.

FIG. 2 is a block diagram of the components of one embodiment of the recording media identification device. The photodetector array 22 is connected to an analog to digital converter 40, which provides input to a processor 42 with associated memory 44. Processor 42 controls the measurement process, including the sequence of illumination and image capture, and processes the digitized photodetector values. In the embodiment shown in FIG. 2, processor 42 is connected to a printer controller 46. Processor 42 may be an ASIC designed for rapid extraction of characteristics, involving, for example, a hardware Fourier Transform. Alternatively, processor 42 may actually be the printer controller 46.

Image processing in the printer for media identification may be as simple as compressing the data and transmitting it to the host, via communication link 56 attached to the printer controller 46, or as complex as all the operations necessary to derive a characteristic vector (described later). In the simple case, pixel values are communicated to the host (with optional data compression) where the characteristic vector is computed and the media identification made. This is attractive because it simplifies the image processing in the printer with a potential saving in cost and increase in flexibility. Using the resources of the host computer, the characteristic vector and media identification may be done very rapidly, and the process and selection criteria can be updated when new drivers are made available. The minor disadvantage is a short delay as pixel data are sent back to the host.

When the characteristic vector is computed in the printer, fewer bytes are transmitted than when the identification process is performed in the host computer. This would be more appropriate when two-way communication with a host is not convenient, as when print jobs are sent to a print queue on a printer server on a network, or as when a print job is downloaded by infra-red link from a portable information appliance.

In FIG. 2, the printer controller 46 is shown controlling the printhead 50, media transport drive 51, printer carriage 52, and user display 54. It will be appreciated that other elements of a printer could also be controlled by the printer controller 46 in response to identification of specific recording media. The processor 42 is also connected to the illumination sources 12, 14, and 16, the photodetector array 22, and converter 40 via link 48. Link 48 is used to send signals from the processor 42 to control, for example, the timing of illumination by each illuminator and data acquisition by the array 22 and converter 40.

To identify a recording medium, output from the photodetector array 22 is converted to digital form and processed into a vector of characteristic values (described later). This vector is compared to previously stored reference vectors, each reference vector being characteristic of a different type of recording medium, to determine the medium type.

As described above, the medium identification device of the present invention includes one or more illumination sources. In some embodiments, information from multiple illumination sources is obtained by time sequencing the measurements, first turning on one illumination source and obtaining a signal and then turning on a second illumination source and obtaining a second signal etc. Alternatively, information from multiple photosensor arrays (with respective converters, illumination sources, and optics) is obtained and processed together. The spectral output of the various sources may be different to provide optimized differentiation of characterization vectors and/or to allow dichroic filters to be used to combine some of the optics when using multiple photosensor arrays. Beam division beam splitters, or other beam selecting devices such as a rotatable wheel of multiple apertures and/or mirrors, can be used in place of beam splitter 18. Converter 40 may use quantization levels for a 256 level gray scale or lower, such as a 16 level gray scale.

Characteristics of the recording medium forming the basis of classification of media may include integrated reflectivity over the field (or average gray scale value), distribution of gray scale values, spatial frequencies of features in the image, and number of features in the image within a specified band of feature parameters. Features are defined, for example, as regions of contiguous pixels, all above a threshold gray scale value. These and other characteristics are derived from processing the digitized output of the photodetector array 22. Spatial frequencies may be determined, for example, by a standard use of one- or two-dimensional Fourier transforms.

Each characteristic value constitutes one element of the characteristic vector. For embodiments in which multiple types of illumination sources are used, each illumination type produces a subset of characteristic elements. Each type of illumination could be implemented in multiple colors to provide even additional characteristic elements.

The characteristic vector, denoted by V, is compared with reference vectors $R_i$ that have been stored in the memory 44 (or within the host computer) to identify the recording medium. Each reference vector $R_i$ is characteristic of a different type of recording medium. If P characteristic values provide reliable media identification, then the reference vectors $R_i$ and the characteristic vector V have the dimension P. In typical applications, P will range between 3 and 10. Each recording medium corresponds to a region in a P-dimensional space representing the range of expected values corresponding to that medium. The size of the range reflects batch to batch variation in manufacture of the media, differences between manufacturers of similar media, and variation of measurement. If the characteristic vector V lies within the region corresponding to a particular medium type, it is identified as that medium.

Figure 3:
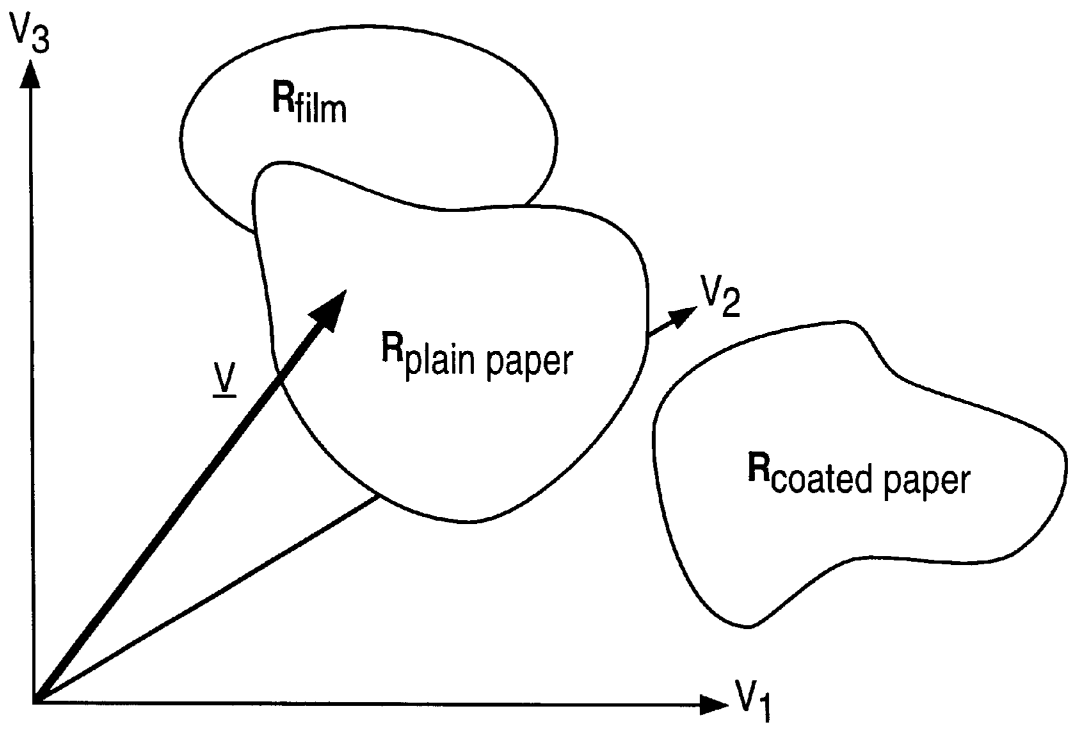
FIG. 3 is a schematic representation of the characteristic values used to identify recording media.

The comparison of characteristic vector V with reference vectors $R_i$ is shown schematically in FIG. 3 for the case where the dimension P is 3. The comparison may take the form of a simple algebraic test of whether the vector V lies within a P-dimensional sphere of radius $S_i$ around a reference vector $R_i$. Expressed mathematically, vector V is identified as belonging to recording medium i if the inequality:

$$\left[\sum_{j=1}^{P}(V_j-(R_i)_j)^2\right]^{1/2}\leq S_i$$

is satisfied. Alternatively, standard techniques known in the art for finding membership functions using fuzzy logic, such as use of multidimensional polynomials or look-up tables, may be used for the comparison.

Figure 4:
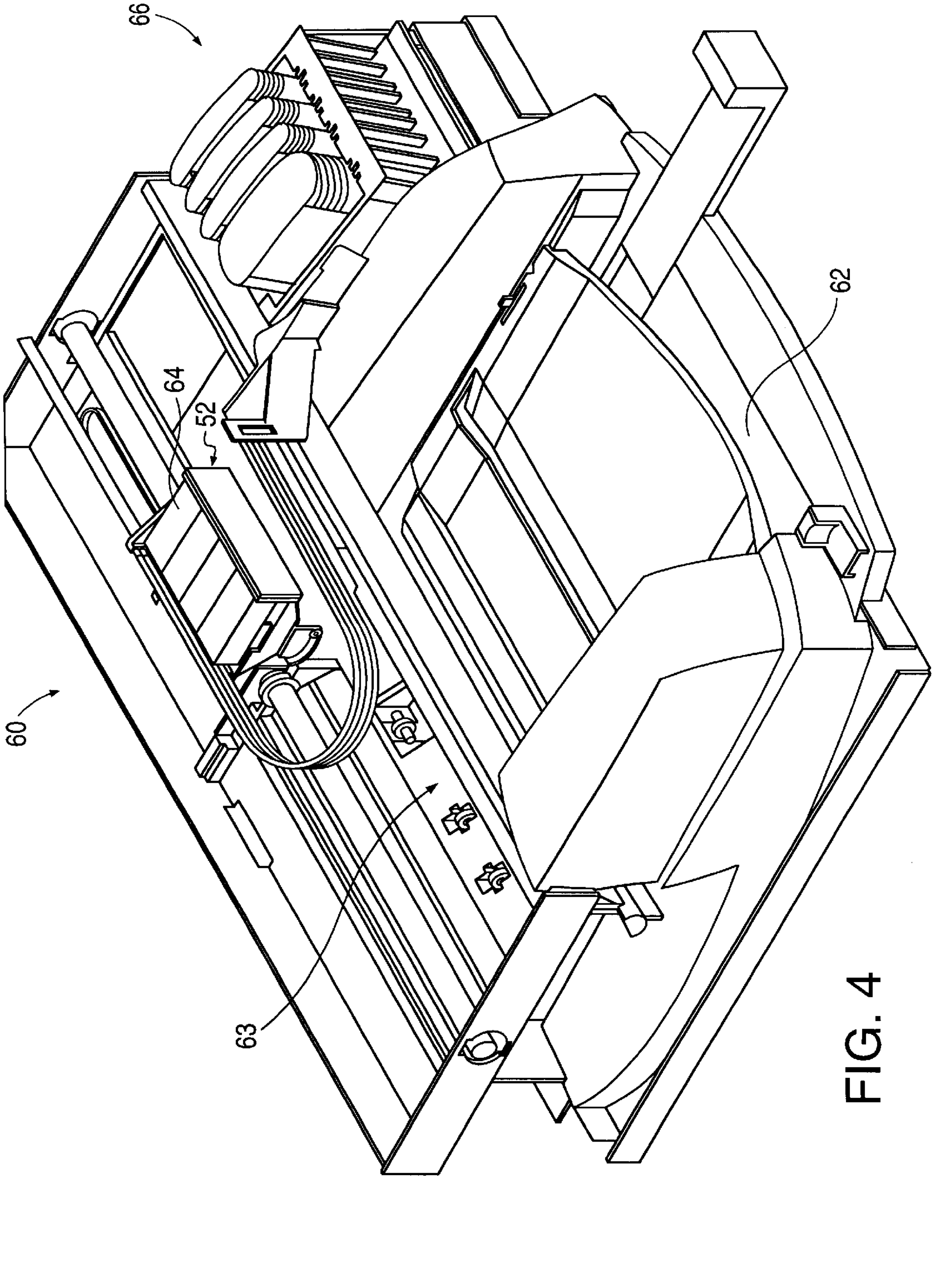
FIG. 4 is one example of a printer including the recording media identification device of the present invention.

The printer elements indicated schematically within FIG. 2 are elements, for example, of a desk top ink jet printer 60 as shown in FIG. 4. The device of FIG. 1 is internal to the printer 60 along the media path. Generally, printer 60 has a media tray in which sheets 62 of media are stacked. A roller assembly forwards each sheet 62 into a print zone 63 for printing. Print cartridges 64 mounted in a carriage 52 are scanned across the print zone, and the medium is incrementally shifted through the print zone. Ink supplies 66 for the print cartridges 64 may be external to or internal to the print cartridges 64.

This and other printers typically operate in multiple, user-specified quality modes, termed, for example, "draft", "normal", and "best" modes. To optimize performance of an ink jet printer, properties such as ink drop volume, number of drops per pixel, printhead scan speed, number of printhead passes over the same area of the medium, and whether pigmented black or composite dye-based black (i.e., combination of cyan, magenta, and yellow dyes) is used, are customized to each recording medium and for each print quality mode. In a laser printer, typically, the media feed rate, exposure levels, toner charging, toner transfer voltage, and fuser temperature might be adjusted to optimize performance on different media.

The main categories of recording media are plain paper, coated matte paper, coated glossy paper, transparency film, and "photographic quality" paper. Large format ink jet printers support additional media such as cloth, Mylar, vellum, and coated vellum. In printers designed to uses these media, appropriate additional categories can be defined to identify these materials.

A new characteristic vector $R_i$ can be developed for new or unknown media type by training the printer with several measurements and samples with user intervention to specify the preferred print mode. This allows old media to be retired and new formulations introduced. In addition, the print mode can be automatically set to optimize print quality to the formulation of a local special paper, such as an organization's stationery, which may have a special rag and wood pulp content, filler, and sizing.

Although the invention has been described with reference to particular embodiments, the description is only an example of the invention's application and should not be taken as a limitation. Various adaptations and combinations of features of the embodiments disclosed are within the scope of the invention as defined by the following claims.

We claim:

1. An apparatus comprising:

at least one illumination source disposed near a media path for a recording medium, light from said at least one illumination source impinging on a surface of said recording medium;

at least one sensor element positioned to receive light from said surface, generated by said at least one illumination source, so as to detect radiation intensity from an area on said surface that has a dimension smaller than 100 μm; and a processing device for receiving signals corresponding to outputs of said at least one sensor element, said signals being processed to identify said recording medium.

2. The apparatus of claim 1 wherein said at least one illumination source comprises a source of illumination directed at said recording medium at an acute angle relative to said surface.

3. The apparatus of claim 2 wherein said acute angle is less than sixteen degrees.

4. The apparatus of claim 2 wherein said at least one illumination source further comprises a source of illumination directed at an angle that is generally perpendicular to said surface.

5. The apparatus of claim 4 wherein said at least one illumination source further comprises a source of transmission illumination through the recording medium.

6. The apparatus of claim 1 wherein each sensor element receives light from an area on said surface that has a dimension of between approximately 5 μm and 50 μm.

7. The apparatus of claim 1 wherein said processing device is an ASIC.

8. The apparatus of claim 1 wherein said at least one sensor element comprises a two-dimensional array of sensor elements.

9. The apparatus of claim 1 wherein said at least one sensor element comprises a one-dimensional array of sensor elements.

10. The apparatus of claim 1 further comprising:

a printer controller that receives signals from said processing device; and a printer controlled by said printer controller according to the recording medium identified by the processing device.

11. The apparatus of claim 1 wherein said processing device is also a printer controller and wherein said processing device controls a printer according to the recording medium identified.

12. A method of identifying recording media in a printer comprising:

illuminating a surface of the recording medium with at least one illumination source;

sensing light from said surface in at least one sensor element;

producing a signal in said at least one sensor element responsive to light from said surface;

processing said signal to form a characteristic vector;

comparing said characteristic vector with a plurality of reference vectors characteristic of different recording media to determine media type; and controlling the printer according to the identified recording medium.

13. The method of claim 12 wherein processing said signal comprises processing said signal in a processor in the printer connected to said at least one sensor element.

14. The method of claim 12 wherein processing said signal comprises processing said signal in a host computer attached to said printer.

15. The method of claim 12 wherein said characteristic vector comprises spatial frequencies in an image of said recording medium.

16. The method of claim 12 wherein said characteristic vector comprises average gray scale values in an image of said recording medium.

17. The method of claim 12 wherein said characteristic vector comprises a distribution of gray scale values in an image of said recording medium.

18. The method of claim 12 wherein said characteristic vector comprises a number of features within a specified range of gray scale values in an image of said recording medium.

19. The method of claim 12 wherein illuminating a surface of the recording medium with at least one illumination source comprises illuminating a surface of the recording medium with illumination directed at an acute angle relative to said surface.

20. The method of claim 19 wherein illuminating a surface of the recording medium with at least one illumination source comprises illuminating a surface of the recording medium with illumination directed at an angle less than sixteen degrees relative to said surface.

21. The method of claim 19 wherein illuminating a surface of the recording medium with at least one illumination source further comprises illuminating a surface of the recording medium with illumination directed at an angle that is generally perpendicular to said surface.

22. The method of claim 21 wherein illuminating a surface of the recording medium with at least one illumination source further comprises illuminating a surface of the recording medium with a source of transmission illumination through the recording medium.

23. The method of claim 12 wherein sensing light from said surface in at least one sensor element comprises sensing light from an area on said surface that has a dimension smaller than 100 μm in at least one sensor element.

24. The method of claim 12 wherein sensing light from said surface in at least one sensor element comprises sensing light from an area on said surface that has a dimension between approximately 5 μm and 50 μm in at least one sensor element.

25. The method of claim 12 wherein sensing light from said surface in at least one sensor element comprises sensing light from said surface in a two-dimensional array of sensor elements.

26. The method of claim 12 wherein sensing light from said surface in at least one sensor element comprises sensing light from said surface in a one-dimensional array of sensor elements.

27. The method of claim 26 further comprising moving the medium in the printer in a predetermined direction and wherein said one-dimensional array of sensor elements is oriented perpendicular to said direction, and producing a signal comprises producing a signal as the medium is moved in the printer.

28. The method of claim 12 wherein sensing light from said surface in at least one sensor element comprises sensing light from said surface in a single sensor element.

29. The method of claim 28 further comprising moving the medium in the printer in a predetermined direction, and producing a signal comprises producing a signal as the medium is moved in the printer.

* * * * *